No. 610,607. Patented Sept. 13, 1898.
W. W. LACEY.
SPRING HUB FOR VEHICLE WHEELS.
(Application filed Oct. 7, 1897.)
(No Model.)
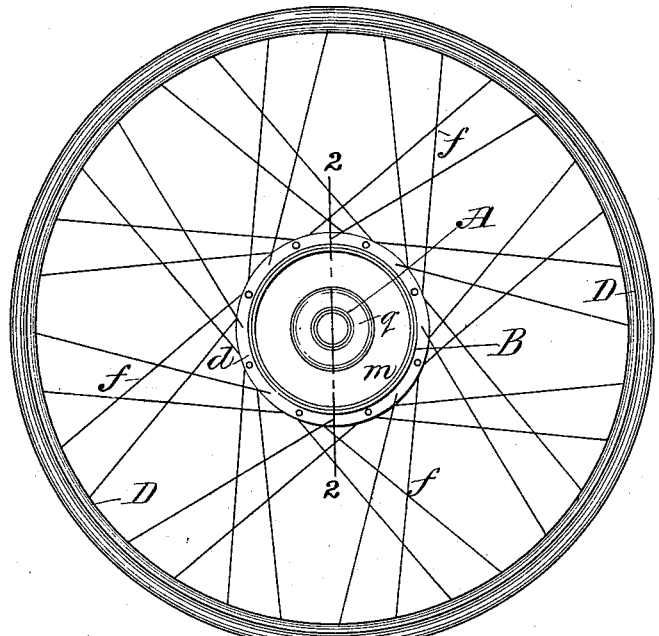
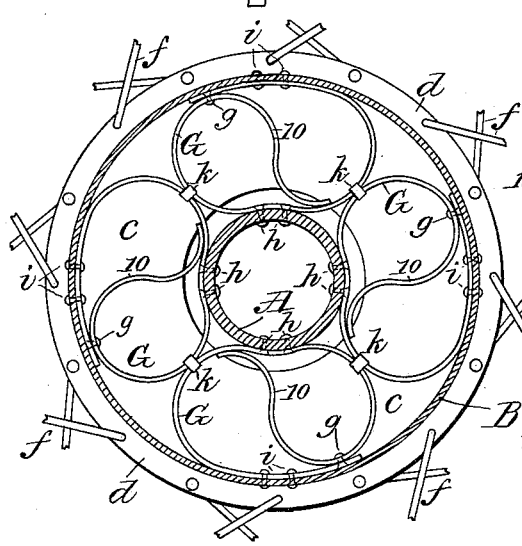
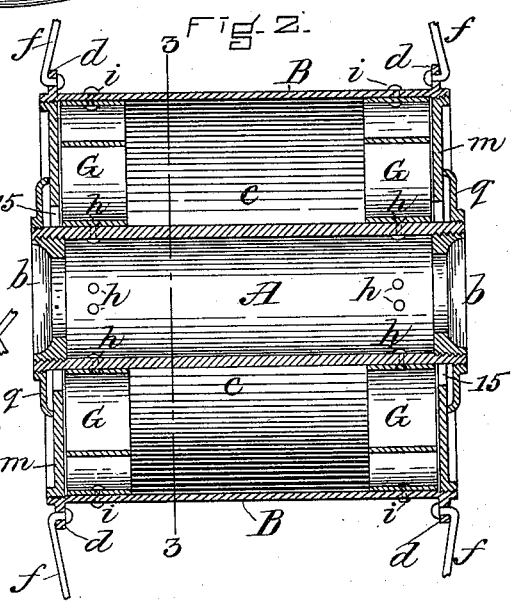
WITNESSES
INVENTOR
William W. Lacey

UNITED STATES PATENT OFFICE.

WILLIAM W. LACEY, OF BOSTON, MASSACHUSETTS.

SPRING-HUB FOR VEHICLE-WHEELS.

SPECIFICATION forming part of Letters Patent No. 610,607, dated September 13, 1898.

Application filed October 7, 1897. Serial No. 654,424. (No model.)

*To all whom it may concern:*

Be it known that I, WILLIAM W. LACEY, a citizen of the United States, residing at Boston, in the county of Suffolk and State of Massachusetts, have invented an Improved Spring-Hub for Vehicle-Wheels, of which the following is a full, clear, and exact description, reference being had to the accompanying drawings, making part of this specification, in which—

Figure 1 is a side elevation of a bicycle-wheel having my improved spring-hub applied thereto. Fig. 2 is an enlarged vertical section on the line 2 2 of Fig. 1. Fig. 3 is a vertical section on the line 3 3 of Fig. 2.

My invention relates to that class of hubs in which there is a hub proper encircled by a tubular band of larger diameter and connected thereto by a series of interposed springs.

The objects of the invention are to so connect and arrange these springs that the wheel will run true by reason of the springs abutting one against the other at their ends and there connected together, thus preventing the springs from swaying or bulging outwardly, even though the wheel be running at a slant, as would be the case with a bicycle in turning a corner; also, to provide each one of these springs with an extension, which at its free end slides on the opposite side of the spring, and thus an easy motion will be afforded.

The invention will be first described and then specifically set forth in the claims.

In the said drawings, A represents the hub of the front wheel of a bicycle, provided, as usual, at its opposite ends with ball-bearing cups $b$.

B is a tubular band or cylinder encircling the hub A and of such diameter as to leave an annular space $c$ between the two, as shown in Figs. 2 and 3. The band B is provided at its opposite ends with peripheral flanges $d$, which are provided with holes to receive the headed ends of tangent spokes $f$, the opposite ends of which are connected in any suitable manner with the wheel-rim D, which may be of wood or metal and of any approved shape or style, the tubular band being thus firmly braced and secured to said rim in such manner that it cannot move independently thereof.

Around each end of the hub A, within the annular space $c$ between the same and the band B, are arranged a series of curved springs G, in the present case four, preferably composed of flat spring-steel bent the one end over the other into the flattened, circular, or eliptical shape shown in Fig. 3, the two portions of the spring being preferably secured together by a rivet $g$, beyond which one end 10 of the spring is bent or curved inwardly, with its free end in sliding contact with the portion next to the hub, thus forming an auxiliary leaf or extension, which increases the strength and resisting power of the spring. Each of the springs G is securely fastened to the hub A by rivets $h$ and to the tubular spoke-band B by rivets $i$, and each spring rests against and is connected with the one next adjacent thereto by means of a clasp or clip $k$, the entire series of springs thus bracing each other and securely tied together, thus avoiding any liability of slip or displacement. The springs G thus entirely surround the hub at each end and form a strong and reliable connection between said hub and the spoke-ring, so that any motion given to the hub—as, for instance, in the driving-wheel of a bicycle—will be transmitted directly to the tubular band and thence through the medium of the spokes to the rim of the wheel.

Into each end of the tubular band B is screwed a head $m$, which serves to exclude the dust, said heads being each provided at the center with an opening 15, Fig. 2, of sufficient diameter to permit of the free play of the hub as the latter yields against the resistance of the springs G, and over each end of the hub is screwed a ring or washer $q$, which rests against and slides on the head $m$ and is of greater diameter than the aperture 15 therein, which is thus closed to prevent the entrance of dust at this point.

By thus supporting the hub at each end on a series of curved springs bent and arranged as shown it is enabled to yield freely in all directions within the spoke-ring, thereby preventing any jar or concussion received by the rim of the wheel in passing over the road from being communicated to the hub and rendering the wheel as easy and elastic as if provided with a pneumatic tire, while the annoyance and inconveniences resulting from the employment of a pneumatic tire are entirely avoided.

The rim may be provided with a tire of any suitable or approved construction, preferably a solid or cushion tire when the wheel is used for bicycles.

What I claim as my invention, and desire to secure by Letters Patent, is—

1. A spring-hub, comprising the inner member or hub proper, the outer larger tube, and a series of bowed springs arranged end to end between said hub and outer tube with their end portions secured together and their inner and outer sides secured to the hub and tube respectively, substantially as described.

2. A spring-hub, comprising the inner member or hub proper, the outer larger tube, and a series of bowed springs arranged end to end between the hub and outer tube, and secured at their inner and outer sides to said hub and tube respectively, each of said springs having therein a spring-leaf fixed to one side and sliding at its free end on the opposite side of the bowed spring, substantially as described.

3. A spring-hub, consisting of the inner member or hub proper, the outer larger tube, and a series of elliptical springs connected together at their abutting ends and arranged between said hub and outer tube and connected thereto at their inner and outer sides, each spring having an extension 10 extending from one side with its free end sliding on the opposite side, substantially as described.

4. A spring-hub, consisting in the inner member or hub proper A, having both ends provided with internal and external screw-threads, the ball-bearing cups $b$ screwed into the hub ends, the outer tube B, having spoke connections, annular heads $m$ screwed into the ends of the tube B and through which project the ends of hub A, rings or washers $q$ screwed on the ends of the hub A and resting against the outer faces of heads $m$ and closing their central openings, and series of elliptical springs connected together at their abutting ends in the space between the hub members A, B, and secured at their inner and outer sides, respectively, thereto; each spring having an extension 10 extending from one side and its free end sliding on the opposite side, substantially as described.

Witness my hand this 5th day of October, A. D. 1897.

WILLIAM W. LACEY.

In presence of—
P. E. TESCHEMACHER,
B. L. MARDEN.